Sept. 15, 1942.   H. D. BREEN ET AL   2,295,827
HATCH COVER LIFTER
Filed April 21, 1941   3 Sheets-Sheet 1

Inventors:
Henry D. Breen and
Oliver L. Champion,
By Dawson, Ooms & Birth
Attorneys.

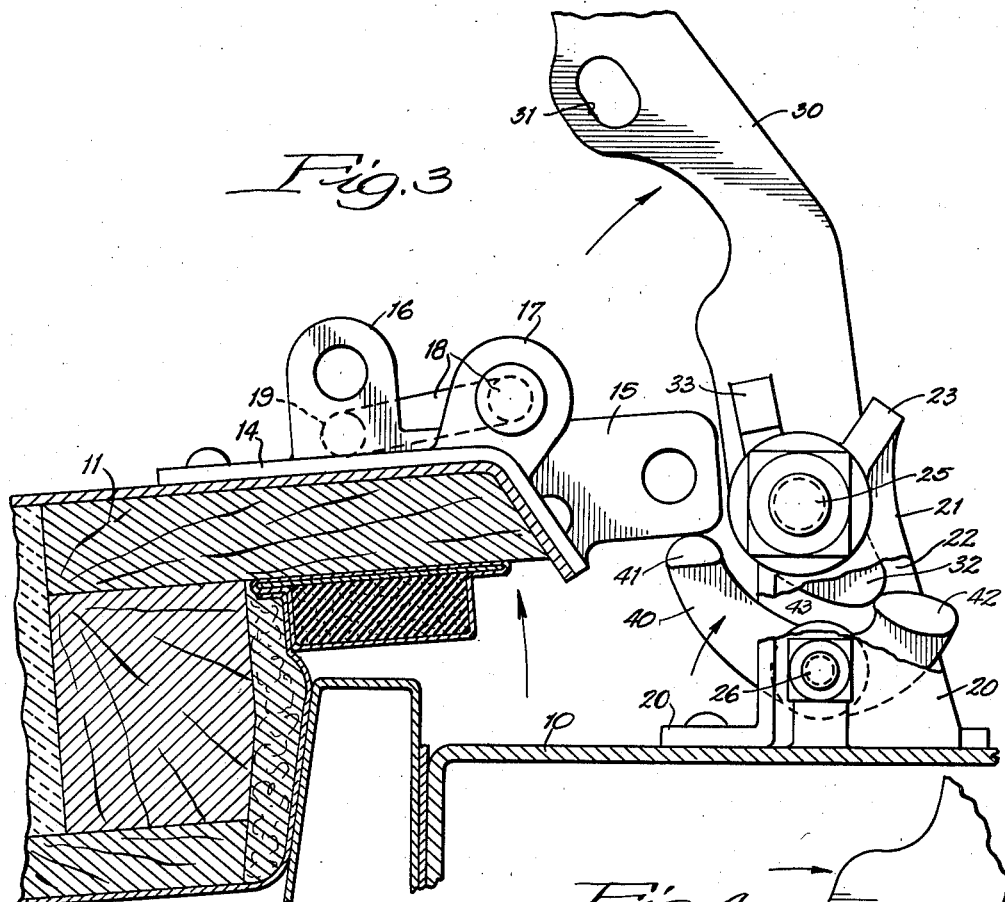
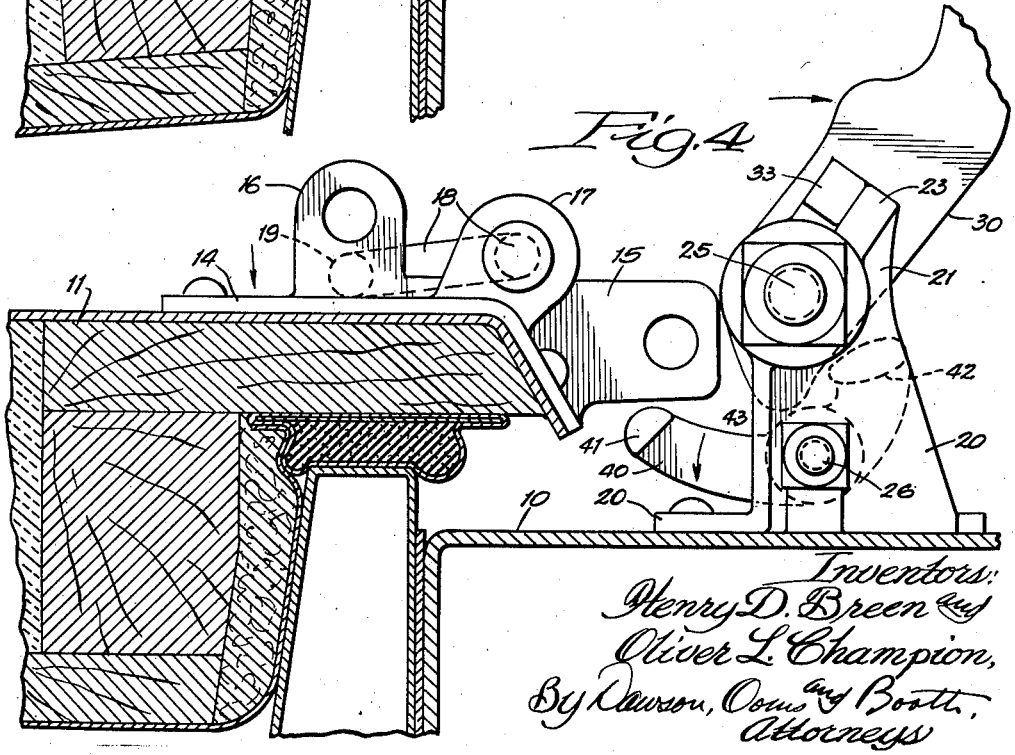

Sept. 15, 1942.    H. D. BREEN ET AL    2,295,827
HATCH COVER LIFTER
Filed April 21, 1941    3 Sheets-Sheet 3
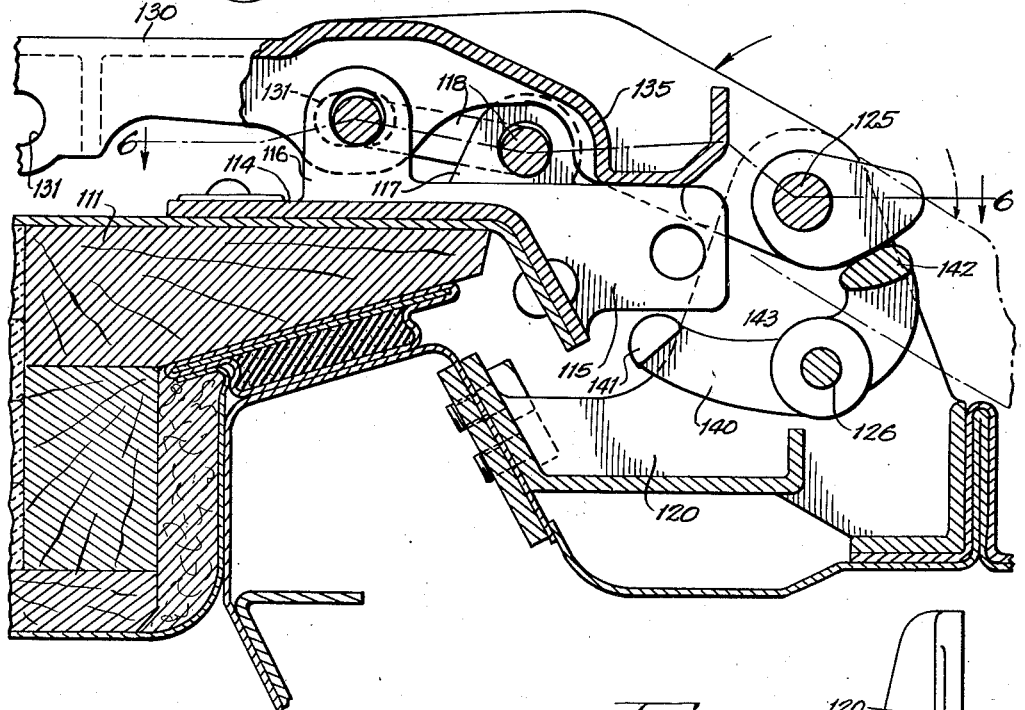
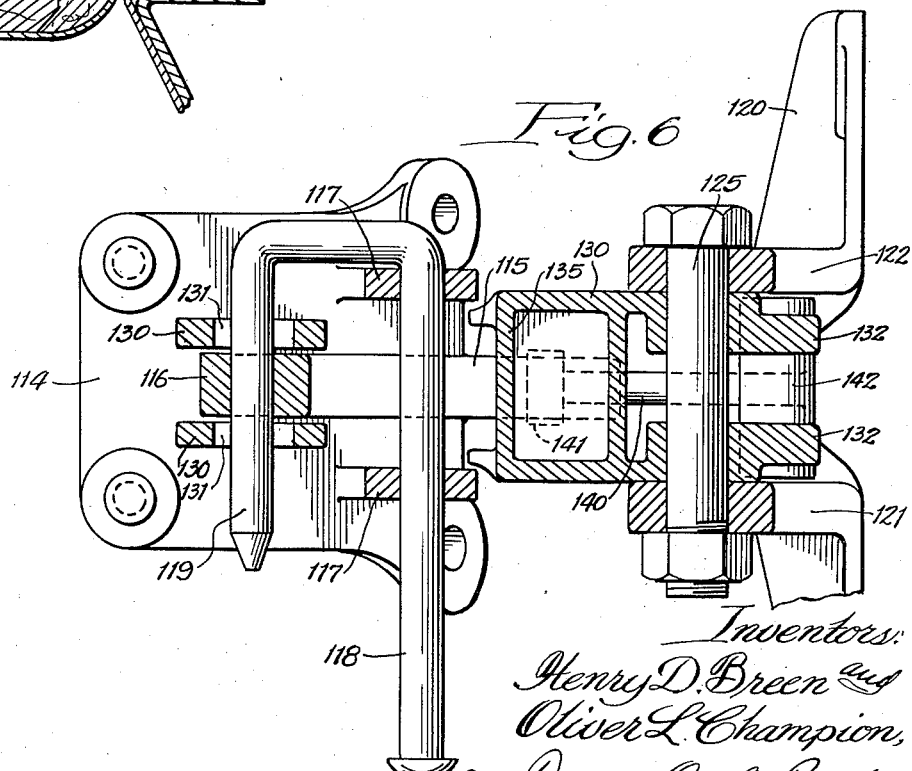
Inventors:
Henry D. Breen and
Oliver L. Champion,
By Dawson, Ooms and Booth
Attorneys.

Patented Sept. 15, 1942

2,295,827

UNITED STATES PATENT OFFICE 2,295,827

HATCH COVER LIFTER

Henry D. Breen and Oliver L. Champion, Chicago, Ill., assignors to Union Asbestos & Rubber Company, Chicago, Ill., a corporation of Illinois Application April 21, 1941, Serial No. 389,628

7 Claims. (Cl. 268—74)

This invention relates to a hatch cover lifter and is particularly applicable to hatch covers such as are employed upon refrigerator cars and similar structures. The invention is equally applicable to hatches and hatch covers upon stationary buildings and compartments.

One of the objects of the invention is to provide a hatch cover lifter which is simple in construction and has few moving parts.

A further object of the invention is to provide a hatch cover lifter by which heavy forces may be applied to the hatch cover to lift it when it has been closed, and also to force the hatch cover tightly down into closed position.

An important object of the invention is to provide a hatch cover lifter in which the hatch cover can be positively lifted from the hatch, but in which the return of the hatch cover to closed position will impart no movement to the hatch cover lifter.

Other objects, advantages and capabilities of the invention will appear from the following description of a preferred embodiment thereof, taken in conjunction with the accompanying drawings, in which:

Fig. 3 is a view similar to that of Fig. 2 with the hatch cover lifter being operated to lift the hatch cover from the hatch;

Fig. 4 is a view similar to Fig. 3 with the operating lever of the hatch cover lifter moved into a more advanced position;

Fig. 5 is an elevation partly in section of an alternative form of hatch cover lifter of this invention; and Fig. 6 is a sectional view of the hatch cover lifter shown in Fig. 5, taken on the line 6—6 of Fig. 5.

Figure 1:
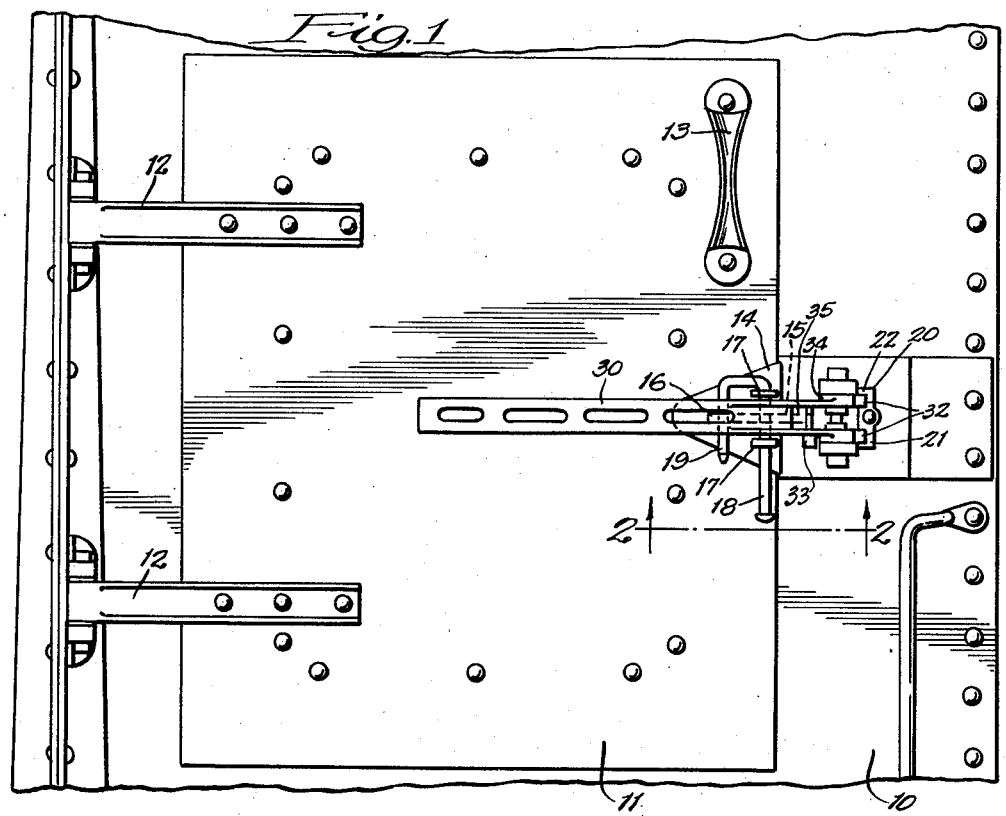
Figure 1 is a plan view of a hatch cover swung into closed position over a hatch in the roof of a conventional refrigerator car, of which a fragment is shown, and to which is applied the hatch cover lifter of this invention.

Referring to the drawings, the reference numeral 10 indicates a portion of the roof of a conventional refrigerator car fitted with a hatch and hatch cover to which this invention is applied. In the top of the refrigerator car is a hatch, not shown, which is closed by the hatch cover or hatch plug 11 pivoted to the top of the refrigerator car by means of the hinges 12. The hatch cover is provided with the handle 13 by which it can be swung upon the hinges 12 into open position. At the free end of the hatch cover 11 is also mounted the hatch cover lifter of this invention, which is shown in greater detail in Figs. 2, 3 and 4.

*Description of the hatch cover lifter*

Secured to the hatch cover at the free end thereof is the hatch cover bracket 14, which is best shown in Figs. 3 and 4. This bracket is rigidly secured to the hatch cover and terminates in the tongue 15 which projects beyond the edge of the hatch cover to provide an abutment against which the force of the hatch cover lifter is applied. Projecting from the hatch cover bracket 14 are the vertical perforated ears 16 and 17 designed to receive the U-shaped seal pin 18 by which the hatch cover and the hatch cover lifter may be locked in closed position and by which the hatch cover may be held in various open positions as hereinafter described.

The hatch cover lifter comprises the operating lever fulcrum bracket 20, the operating lever 30, and the rocking crank 40.

The operating lever fulcrum 20 is rigidly secured to the roof of the refrigerator car adjacent the hatch and has projecting vertically therefrom the flanges 21 and 22. These flanges terminate in the abutments 23 and 24 and are perforated to provide the bearings 25 for the operating lever 30.

Beneath the bearings 25 the operating lever fulcrum 20 is formed to provide the bearing 26 for the rocking crank 40.

The hatch cover operating lever is journaled in the bearings 25 and is formed in the shape of a channel with a series of perforations 31 cut into the side walls thereof. These perforations are designed to receive the end 19 of the seal pin 18 to secure the hatch cover to the operating lever in various positions. Beyond the bearing 25 the operating lever 30 is formed into the cams 32 by which the rocking crank 40 is operated.

On the journaled end of the operating lever are mounted the bosses 33 and 34 designed to rest upon the abutments 23 and 24 of the operating lever fulcrum when the lever is in open position. These bosses may be omitted if it is desired to swing the operating lever down against the top of the car when in wide open position.

Between the walls of the operating lever 30, near the pivot thereof, is formed the shoulder 35 (see Fig. 2) designed to bear against the upper surface of the hatch cover bracket tongue 15 when the operating lever is moved into closed position.

Figure 2:
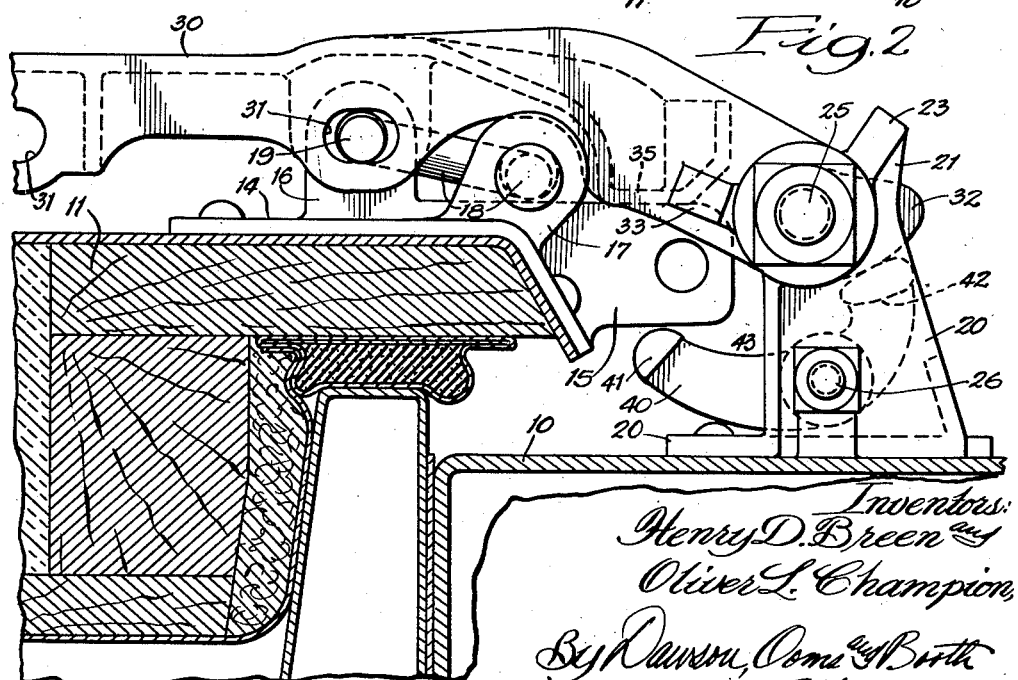
Fig. 2 is a fragmentary sectional view of one end of the hatch and hatch cover, and an elevation of the hatch cover lifter applied thereto.

The rocking crank 40 is formed, as shown in Figs. 2, 3 and 4, into a short crank pivoted in the bearing 26. The ends of the rocking crank are formed into the bosses 41 and 42 which are designed respectively to engage the ear 15 of the hatch cover bracket 14 and the cams 32 upon the operating lever 30 as shown in Fig. 3. It is to be observed that the rocking crank 40 is substantially bow-shaped so that the bosses 41 and 42 project above the bearing 26 upon which the rocking crank is pivoted and thus form a recess 43 between the arms of the bow.

Description of alternative form of hatch cover lifter

In the alternative form of hatch cover lifter shown in Figs. 5 and 6 the hatch cover is provided with a hatch cover bracket 114 substantially like that heretofore described as hatch cover bracket 14. This bracket terminates in the ear 115 which serves as an abutment for the rocking crank 140 and the boss 141 in which the rocking crank terminates. The hatch cover bracket is provided with the vertical ears 116 and 117 designed to receive the seal pin 118 by means of which the hatch cover may be held by the operating lever 130 in various partially open positions.

In this alternative form of construction the principal difference from the hatch cover lifter heretofore described lies in the form of the operating lever fulcrum which is employed.

The operating lever fulcrum 120 is formed with the vertical flanges 121 and 122 which terminate in the bearings 125 in which the operating lever 130 is journaled.

The operating lever fulcrum also bears the vertical flange 127 in which the rocking crank 140 is pivotally borne by the bearing 126.

The rocking arm 140 is formed, as shown in Figs. 5 and 6, into a short lever pivoted in the bearing 126. The ends of the rocking crank are formed into the bosses 141 and 142 which are designed respectively to engage the ear 115 of the hatch cover bracket 114 and the cams 132 upon the operating lever 130 as shown in Fig. 5. It is to be observed that the lifting cam 140 is substantially bow-shaped so that the bosses 141 and 142 project above the bearing 126 upon which the lifting cam is pivoted and thus form a recess 143 between the arms of the bow.

The operating lever 130 is substantially channel shaped with the perforations 131 in the side walls of the channel to receive the end 119 of the locking pin 118. The operating lever is journaled in the bearing 125 upon the operating lever fulcrum and terminates in the cams 132 designed to engage the boss 142 upon the rocking crank 140. Between the side walls of the operating lever 130, the operating lever is formed into the shoulder 135 which is designed to bear against the upper surface of the hatch cover bracket tongue 115 when the operating lever is moved into closed position.

Operation of the hatch cover lifter

As both forms of the hatch cover lifter of this invention operate in the same manner, the description of the operation will be confined to the form of the invention first described, to wit, that shown in Figs. 1, 2, 3 and 4. Assuming the respective parts to be in the position indicated in Fig. 1, if it is desired to open the hatch cover, the seal pin 18 is forced toward the handle 13 and the free end 19 of the seal pin passes out of the perforations in the hatch cover bracket ear 16 and the perforations 31 in the operating lever 30, thus unlocking the operating lever 30.

The operating lever can be lifted by its free end and swung about the pivot 25. As soon as any substantial movement of the operating lever 30 is effected the cams 32 upon the pivoted end thereof are brought into engagement with the boss 42 upon the rocking crank 40, forcing the crank to swing about the pivot 26. Thereupon the boss 41 at the end of the rocking crank 40 nearest the hatch is brought into engagement with the lower surface of the tongue 15 of the hatch cover bracket, freeing the hatch cover and forcing it slightly open. This operation is best shown in Fig. 3, where the respective parts are shown in the position in which the operating lever 30 is still exerting a force against the hatch cover 11 through the cams 32, boss 42, rocking crank 40, boss 41, and hatch cover bracket tongue 15. If the lever is moved beyond the position shown in Fig. 3 the cams 32 travel beyond the surface of the boss 42 and into the recess 43 between the bowed arms of the rocking crank 40, thus freeing the boss 42 and permitting the rocking crank to fall into the horizontal inactive position indicated in Fig. 4.

The hatch cover has by this manipulation been freed from the hatch and although it may fall to a slight extent it can be readily swung into open position by means of the handle 13.

If the operating lever is of the type shown in Figs. 1-4, fitted with the bosses 33 and 34 these will come to rest against the abutments 23 and 24 upon the operating lever fulcrum and the lever will remain in the open position indicated in Fig. 4. If the operating lever 30 is not provided with the bosses 33 and 34 the lever may be swung into fully open position against the top of the refrigerator car where it will lie substantially horizontal and beyond the hatch.

If desired, the hatch cover may be swung a half revolution about the hinges 12 until it lies flat against the roof of the refrigerator car on the side of the hatch opposite that from the side upon which the hatch cover lifter is mounted.

If it is desired to maintain the hatch cover in partially open position the ear 15 upon the hatch cover bracket can be brought between any one of the perforations 31 in the operating lever 30 and the free end 19 of the seal pin 18 forced through the aligned perforations to secure the hatch cover in partially open position.

When it is desired to close the hatch cover it is swung about the hinges 12 into the hatch. Even though the hatch cover is thrown into closed position violently it cannot impart any action to the operating lever 30 when the hatch cover bracket ear 15 strikes the boss 41 upon the rocking crank 40, because the cams 32 at the end of the operating lever lie in the recess 43 between the arms of the rocking crank.

With the hatch cover in the hatch the operating lever can be swung into closed position. In passing, the cams 32 will strike the boss 42 upon the rocking crank 40 and force the boss 41 against the hatch cover bracket ear 15 and may raise the hatch cover slightly. When the operating lever is brought into fully closed position against the top of the hatch cover the cams 32 will be freed from engagement with the boss 42 as indicated in Fig. 2 and the shoulder 35 will be forced against the upper surface of the hatch cover bracket tongue 15, forcing the hatch cover tightly into the hatch. With the operating lever 30 in fully closed position the perforations 31 in the operating lever 30 will be aligned with the perforations in the ear 16 on the hatch cover bracket and the free end 19 of the seal pin 18 can be slid through the perforations to secure the operating lever 30 and the hatch cover in fully closed position.

Although the invention has been disclosed in connection with the specific details of a preferred embodiment thereof, it is to be understood that such details are not intended to be limitative of the invention except insofar as set forth in the accompanying claims.

Having described our invention, what we claim as new and desire to secure by Letters Patent is:

1. A hatch cover lifter comprising a pivoted operating lever, a cam on said operating lever, a rocking crank pivoted independently of said operating lever and so mounted as to be moved by the cam on said operating lever only when said operating lever is moved through a predetermined portion of its range of movement said crank having an end engageable with the hatch cover to lift it when the crank is moved by the cam.

2. A hatch cover lifter comprising a pivoted operating lever, a pivot therefor, a cam upon said operating lever, a rocking crank pivoted upon a second pivot having a different axis from the axis of the pivot for said operating lever, said rocking crank being so mounted as to be engaged by and moved by said operating lever cam only while said operating lever is moving through a predetermined portion of its range of movement said crank having an end engageable with the hatch cover to lift it when the crank is moved by the cam.

3. A hatch cover lifter comprising an operating lever, a cam thereon, a pivot for said operating lever, a rocking crank having one arm thereof formed for engagement by said cam, a pivot for said crank, said pivots being so spaced from each other that said cam will engage said crank arm through only a predetermined portion of the range of movement of said operating lever said crank having an end engageable with the hatch cover to lift it when the crank is moved by the cam.

4. A hatch cover lifter comprising a pivoted operating lever, a pivot therefor, a cam thereon, a rocking crank having an arm thereon, and a pivot for said crank displaced from said operating lever pivot so that the arcs described by said operating lever cam and said rocking crank arm intersect said crank having an end engageable with the hatch cover to lift it when the crank is moved by the cam.

5. A hatch cover lifter comprising an operating lever, a pivot therefor, a cam thereon, a rocking crank, a pivot therefor, and an arm on said crank, said pivots being so located with respect to each other that said cam will engage said arm only while said operating lever is moved through an angle of substantially ninety degrees said crank having an end engageable with the hatch cover to lift it when the crank is moved by the cam.

6. A hatch cover lifter for a hatch cover, having a tongue thereon, comprising an operating lever designed to overlie said hatch cover in closed position, a pivot for said operating lever whereon said operating lever may be swung clear of said hatch cover, a cam on said operating lever, a rocking crank, a pivot therefor, an arm on said rocking crank extending beneath said tongue, and a second arm on said rocking crank lying beneath said cam, said pivots being so located with respect to each other that as said operating lever is swung from its closed position to its open position said cam will first engage said second arm and lift said hatch cover and will then move into a position between said arms and out of engagement with said crank.

7. A hatch cover lifter for a hatch cover, having a tongue thereon, comprising an operating lever designed to overlie said hatch cover in closed position, a pivot for said operating lever whereon said operating lever may be swung clear of said hatch cover, a cam on said operating lever, a rocking crank, a pivot therefor, and arms on said crank engageable by said tongue and said cam respectively, said pivots being so located with respect to each other that when said operating lever is swung from its position overlying said hatch cover said cam will engage said rocking crank and will lift said hatch cover and will then clear said rocking crank so that movement of said hatch cover will not be imparted to said cam and operating lever.

HENRY D. BREEN.
OLIVER L. CHAMPION.